Nov. 8, 1927.  1,648,841
C. S. CRAWFORD ET AL
OILING SYSTEM FOR AUTOMOBILES
Filed Dec. 28, 1925
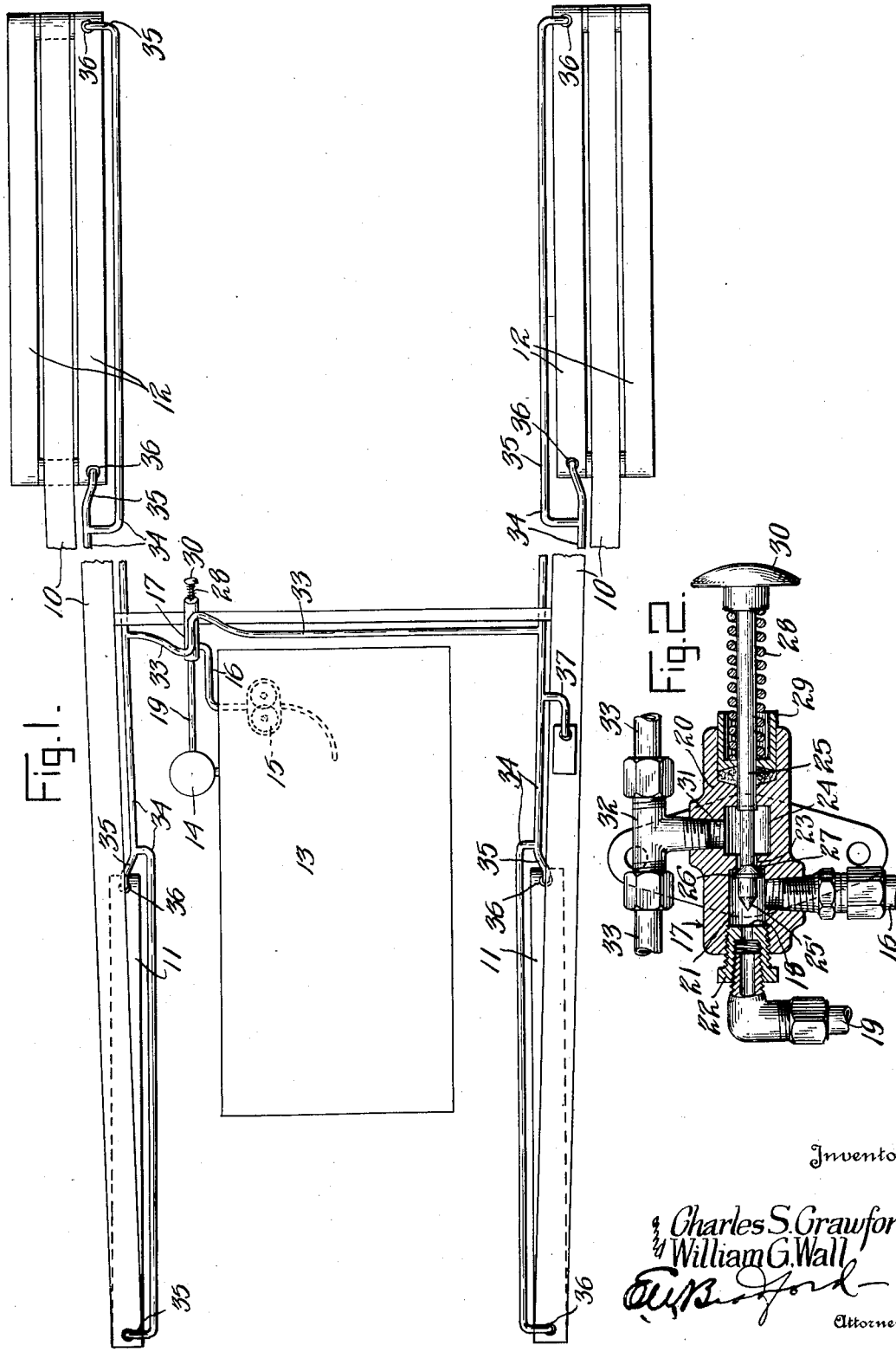
Inventors
Charles S. Crawford
William G. Wall
Attorney Patented Nov. 8, 1927.

1,648,841

UNITED STATES PATENT OFFICE.

CHARLES SHARP CRAWFORD AND WILLIAM GUY WALL, OF INDIANAPOLIS, INDIANA, ASSIGNORS TO F. E. MOSKOVICS, OF INDIANAPOLIS, INDIANA.

OILING SYSTEM FOR AUTOMOBILES.

Application filed December 28, 1925. Serial No. 77,996.

Our invention relates to oiling systems for the chassis of automobiles and the like and consists in means for operatively connecting the high pressure oiling system of the engine with the various points on the chassis requiring lubrication, now generally lubricated by grease cups or by the force-pump method. We find it advantageous to use an oil that is slightly diluted, as it flows better and is less liable to become congealed. We have further found that the oil in the crankcase of the engine fulfills these requirements. To utilize this oil we run a pipe from the circulating pump of the engine and connect its branches permanently at the points heretofore occupied by the grease cups and provide a valve-controlled oil line from the pump, whereby the oil may be forced by the circulating pump in the engine to all bearings on the chassis, all as will be hereinafter more fully set forth.

Referring to the accompanying drawings which are made a part hereof and on which similar reference characters indicate similar parts, Figure 1 is a plan view of the chassis showing our invention applied thereto, and Figure 2, a detail section of the valve for operating the system.

In the drawings, the numeral 10 denotes the frame of a motor vehicle having front supporting springs 11 and rear springs 12, a motor 13 and an oil rectifier 14 of the usual types. A circulating-pump 15, of any approved form, draws oil from the crankcase and forces it through a pipe 16 to one side of a double-acting valve 17 located in a convenient position on the floor of the machine and which in its normal position allows the oil to pass through a valve seat 18 into a pipe 19 which leads to the oil rectifier 14 where the impurities are removed before it passes back to the crank case for use in the engine.

The valve 17 comprises a body portion 20 having a chamber 21 which communicates with the pipes 16 and 19 and having threaded therein a thimble 22 which carries the valve seat 18. A passage 23 connects the chamber 21 with a similar chamber 24 through which passes a valve stem 25 having a valve head 26 normally held in contact with the valve seat 27 formed by the end of the passage 23. The end of the stem is tapered as at 25′ to form a closure for the pipe 19 by coming in contact with the valve seat 18. The valve formed by the members 26 and 27 is normally held closed by a spring 28 encircling the stem and bearing at one end against a packing cup 29 and at the other against a foot-operated plunger head 30.

Leading from the chamber 24 is a port 31 into which is threaded a T-connection 32 having pipes 33 leading to opposite sides of the car as shown in Figure 1 and connected to pipes 34 running the full length of the car. Branch pipes 35 lead from the pipes 34 and are permanently connected as at 36 with the usual grease cups in the spring shackles. Other leads may be connected to the pipe 34 as for instance the pipe 37 which leads to the steering gear bracket 38.

In the operation of the system, when the motor 13 is running, it operates the pump 15 to draw the used oil from the crank case through the valve members 18 and 25′, which are normally held open by the spring 28, to the rectifier 14 then back to the crankcase. When it is desired to lubricate the spring shackles or bearings or other bearing points, the operator presses on the plunger head 30 which moves the valve stem 25 causing the members 18 and 25′ to close thereby shutting off the circulation through the rectifier, and opening the members 26 and 27 allowing the oil to pass through the chamber 24 to the pipes 33 and through the various pipe connections to the several bearings. It is only necessary to keep the valve depressed a few seconds to admit enough oil to properly lubricate the bearings.

It will be obvious to those skilled in the art that various changes may be made in our device without departing from the spirit of the invention and therefore we do not limit ourselves to what is shown in the drawings and described in the specification but only as indicated in the appended claims.

Having thus fully described our said invention, what we claim as new and desire to secure by Letters Patent is:

1. The combination in the pressure oiling system of an automobile, of a plurality of oil utilizing devices including an oil refiner and a conduit for conveying oil to the chassis bearings one of which is normally in communication with said pressure system, and means for cutting off the oil utilizing device in normal communication with the system for permitting the oil to flow through the other device, substantially as set forth.

2. In a motor vehicle comprising an engine having a plurality of bearings requiring a constant supply of oil under pressure, a pump having an outlet for delivering oil to the said bearings, an oil purifier normally in communication with the outlet of the pump and adapted to receive a portion of the oil delivered thereby, a plurality of chassis bearings requiring intermittent lubrication, a conduit for supplying oil from the pump to the chassis bearings, valve means for controlling the flow of oil to the purifier and to the chassis bearings, said valve means being constructed and arranged to shut off the flow to either the chassis lubricating system or the purifier when the flow to the other is turned on, substantially as set forth.

In witness whereof, we have hereunto set our hands at Indianapolis, Indiana, this 26th day of December, A. D. nineteen hundred and twenty-five.

CHARLES SHARP CRAWFORD.
WILLIAM GUY WALL.